United States Patent
Kancharla et al.

(10) Patent No.: US 11,347,724 B2
(45) Date of Patent: May 31, 2022

(54) SYSTEM AND METHOD OF ALLOCATION AND CENTRALIZED TRANSACTION HANDLING ACROSS MULTIPLE MICRO SERVICE CLIENTS

(71) Applicant: Dell Products L.P., Round Rock, TX (US)

(72) Inventors: Mahesh Kumar Kancharla, Gurgaon (IN); Debi Prasad Rout, Cuttack (IN); Vamshi Krishna Shenigaram, Hyderabad (IN); Ravi Krishna Yammanuru, Hyderabad (IN); Sisir Samanta, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 421 days.

(21) Appl. No.: 16/688,073

(22) Filed: Nov. 19, 2019

(65) Prior Publication Data

US 2021/0149879 A1 May 20, 2021

(51) Int. Cl.
*G06F 16/23* (2019.01)
*G06F 8/65* (2018.01)
*G06F 9/54* (2006.01)

(52) U.S. Cl.
CPC ............ *G06F 16/2379* (2019.01); *G06F 8/65* (2013.01); *G06F 9/54* (2013.01)

(58) Field of Classification Search
CPC ........... G06F 9/54; G06F 16/2379; G06F 8/65
USPC ....................................................... 707/703
See application file for complete search history.

(56) References Cited

U.S. PATENT DOCUMENTS

| | | | |
|---|---|---|---|
| 2016/0085643 A1* | 3/2016 | Mcalister | G06F 11/203 714/4.12 |
| 2017/0063615 A1* | 3/2017 | Yang | H04L 41/5054 |
| 2019/0089809 A1* | 3/2019 | Theebaprakasam | H04L 67/32 |
| 2020/0125455 A1* | 4/2020 | Neelakanteshwar | G06F 11/1464 |
| 2020/0327124 A1* | 10/2020 | Rosen | G06F 9/4843 |

OTHER PUBLICATIONS

Shi, Shaoqui, et al., "RESTful Information Resource Pool Based on Cloud Computing", Multimedia and Ubiquitous Engineering, LNEE vol. 308, Springer, Berlin, Germany, © 2014, pp. 109-114.*

(Continued)

*Primary Examiner* — Robert Stevens
(74) *Attorney, Agent, or Firm* — Terrile, Cannatti & Chambers, LLP; Emmanuel A. Rivera (57) ABSTRACT

A system, method, and computer-readable medium are disclosed for management of a centralized service for transaction handling across multiple processes that sends connections to a parent process that determines the multiple processes that are used to provide data or upgrade to a user database. Reference identifiers are generated for the connections. The reference identifiers are mapped. Connection of the multiple processes is performed using the reference identifiers to the database to provide data or upgrade to the user database. An abort or rollback is received if all of the other processes are not successful in providing the data or upgrading user database. A commit is received if all of the multiple processes are successful in providing the data or upgrading the user database.

20 Claims, 4 Drawing Sheets

(56) References Cited

OTHER PUBLICATIONS

Das, Tulika, et al., Oracle® Universal Connection Pool for JDBC—Developer's Guide, 11g Release 2 (11.2), Oracle USA, Redwood City, CA, Sep. 2009, 74 pages.*

Gui, Dezhu, et al., "A Method on Connection Pool Service for Distributed Heterogeneous Databases in Urban Geographic Information Public Platform", The International Archives of the Photogrammetry, Remote Sensing and Spatial Information Sciences, vol. XXXVII, Part B4, Beijing, 2008, pp. 801-804.*

* cited by examiner

SYSTEM AND METHOD OF ALLOCATION AND CENTRALIZED TRANSACTION HANDLING ACROSS MULTIPLE MICRO SERVICE CLIENTS

BACKGROUND OF THE INVENTION

Field of the Invention

The present invention relates to the management of information handling systems. More specifically, embodiments of the invention provide a system, method, and computer-readable medium for improved management of micro service processes/clients that provide data and updates to user databases.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In certain implementations, users or customers, can maintain databases that include datasets and/or other types of applications that are provided data and are continuously updated from external applications. Typically, such external applications provide occasion automatic updates on a regular or as needed basis. In certain implementations, connections or connection information is provided to allow the external applications to contact, connect and provide updates/data to the databases. Such connections can be maintained in what can be termed as a "connection pool."

External applications can be monolithic applications with different processes. In certain implementations, when an update is performed, a monolithic application contacts and connects with a database, goes through each process, and a determination is made if updates with all the processes are successful. If not successful with all the processes, an abort as to the update may take place. If successful with all processes, then a commit as to the update may take place.

Updating with large monolithic applications with many processes can be inefficient and take considerable resources and time. Therefore, there is a trend to break up the different processes into what can be termed as micro services provided by separate clients. When an update is performed for a database, the database (i.e., user/customer) accesses different micro services for different processes to perform the update. Although this may be more efficient that use of a monolithic applications, connection and management of the separate micro services can be problematic. Each micro service can have a connection pool; however, all the connections (i.e., connections to different databases) may not be utilized or needed for each process.

When an update is performed, a determination may be needed as to whether all the requisite processes have been successful, and whether an abort or commit can be performed. With separate processes that may be resident and/or executed from different machines or nodes, it can be difficult to keep track or manage transactions/updates and to have a single commit/abort. In other words, executing multiple services or processes in a single transaction, and rolling back (i.e., aborting) or committing can be difficult to manage.

SUMMARY OF THE INVENTION

A system, method, and computer-readable medium are disclosed for management of a centralized service for transaction handling across multiple processes that sends connections to a parent process that determines the multiple processes that are used to provide data or upgrade to a user database. Reference identifiers are generated for the connections. The reference identifiers are mapped. Connection of the multiple processes is performed using the reference identifiers to the database to perform data updates to the database. An abort or rollback is received if all of the other processes are not successful in performing the updates to the database or any other system failures. A commit is received if all of the multiple processes are successful in performing the updates to the database.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for management of micro service processes/clients that provide data and updates to user databases. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
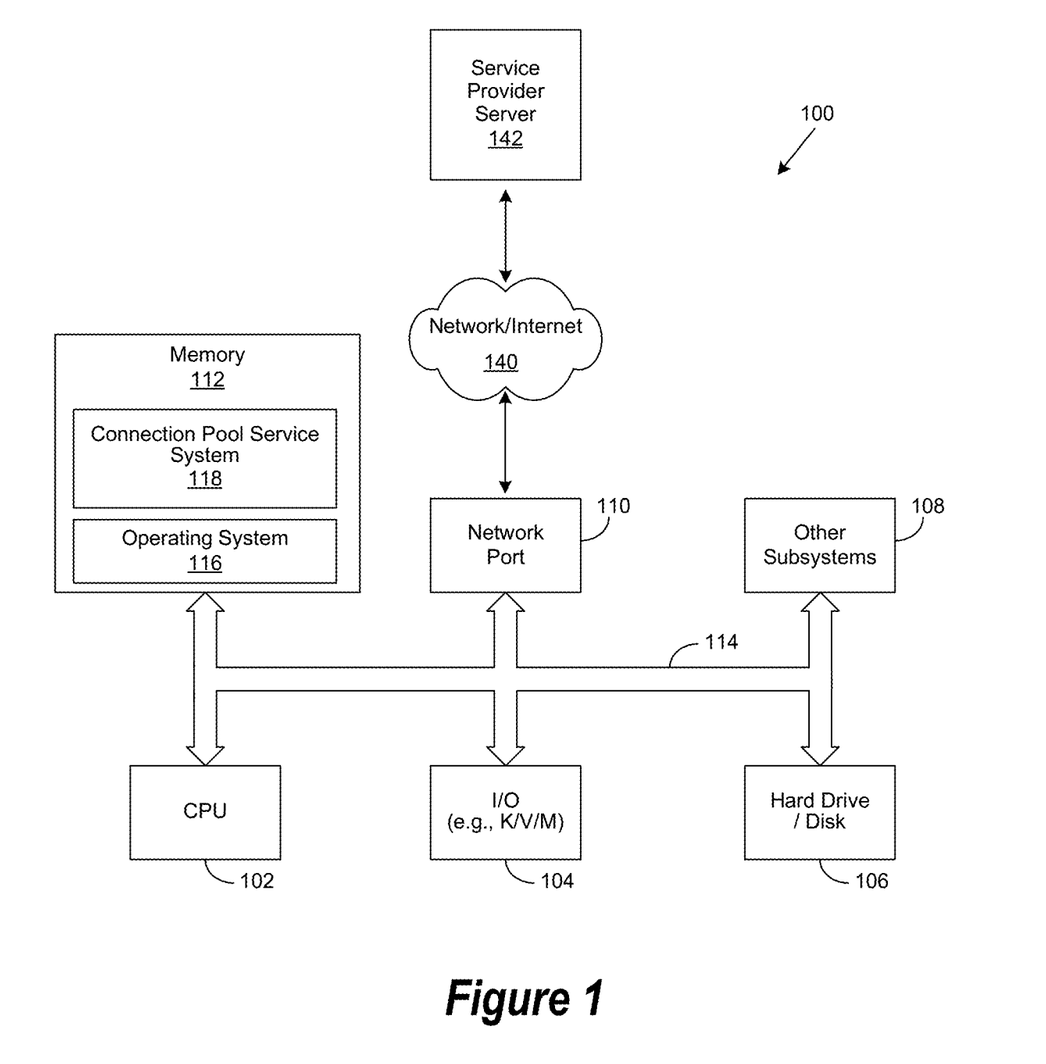
FIG. 1 is a general illustration of components of an information handling system.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also include a connection pool service system 118.

In general, the connection pool service system 118, works with a parent process which is further described below, for improved management of micro service processes/clients that provide data and updates to user databases. As further described below, the connection pool service system 118 is a common and centralized service for the processes, such the parent process and processes provided by micro service clients. In certain implementations, the connection pool service system 118 provides reference IDs (identifiers) for connection between databases (i.e., users/customers) and processes of micro services, when updates/data are to be provided to the databases (i.e., users/customers).

Figure 2:
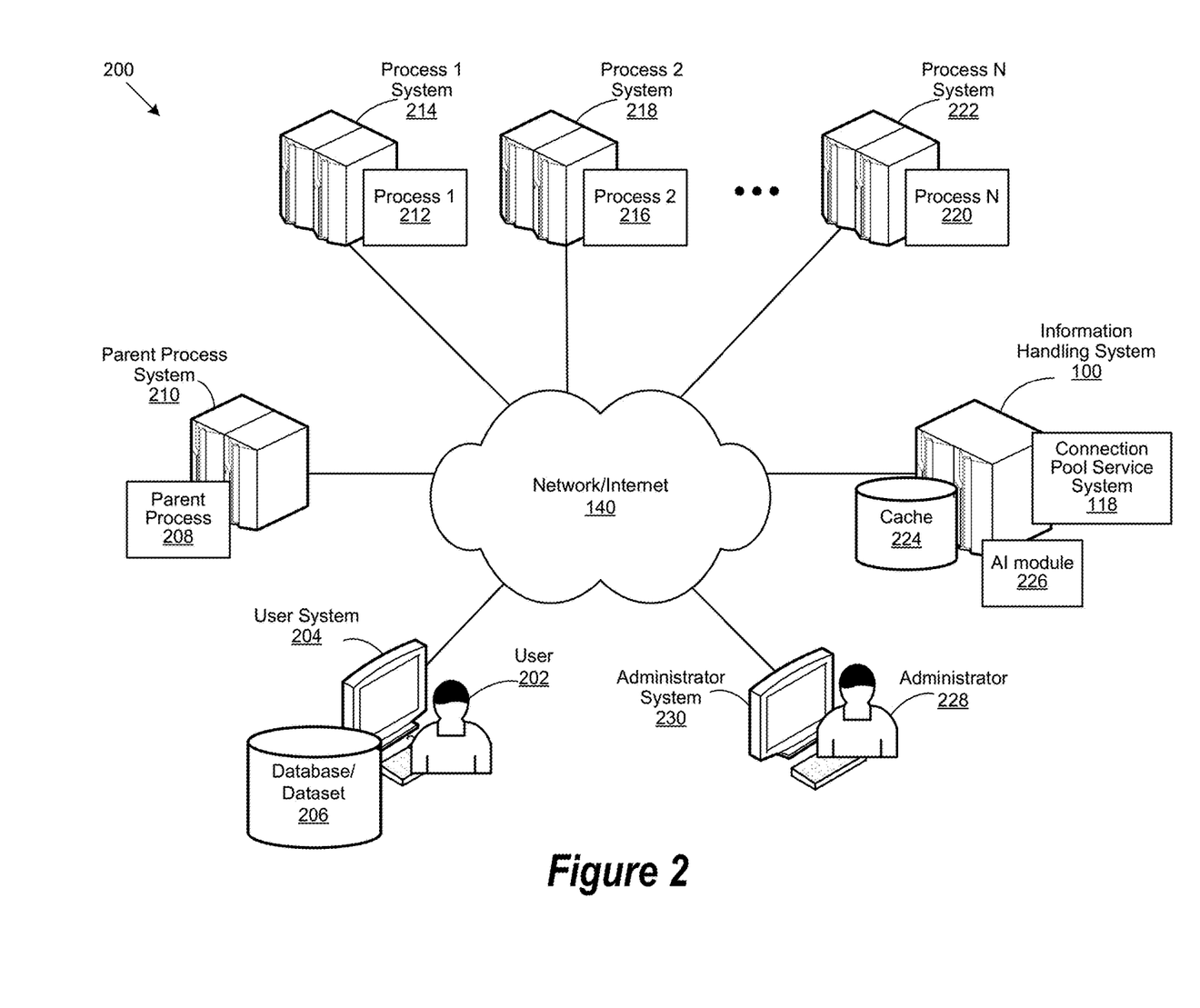
FIG. 2 is a simplified block diagram of a system for allocation and centralized transaction handling across multiple micro service clients or processes.

FIG. 2 is a simplified block diagram of a system 200 for allocation and centralized transaction handling across multiple micro service clients or processes. In certain implementations, customers or users as represented by user 202 through user systems as represented by user system 204, maintain databases as represented by database 206. In certain implementations, the user system 204 can be representative of a business/computing environment that includes various computing devices (e.g., servers), storage, software solutions, hardware (e.g., accessories), etc. In certain implementations, the database 206 includes datasets, data structures, software applications, etc. that are provided data and/or updated from external processes or applications. The providing and/or updating can be performed on a regular or as needed basis. The datasets, data structures, software applications can be related to various uses such business, organizational, governmental, etc. As will be apparent to those of skilled in the art, different uses can be implemented.

In certain embodiments, the processes that provide data and updates to database 206 and datasets, data structures, software applications, etc., include a parent process 208 implementing a parent process system 204, and multiple micro service processes implementing their respective process systems. In this example, the micro service processes and their respective systems are presented by process 1 212 using process system 1 214, process 2 216 using process system 2 218 through process n 220 using process system n 222. In certain implementations, systems 210, 214, 216 and 222 can implement REpresentational State Transfer (REST) Application Program Interfaces (API) or REST APIs.

In certain implementations, the systems 210, 214, 218, and 222 can be representative of a business/computing environment that includes various computing devices (e.g., servers), storage, software solutions, hardware (e.g., accessories), etc. In certain implementations, the systems 210, 214, 218, and 222 can be provided as part of a cloud service or cloud software deployment platform, such as Pivotal Cloud Foundry (PCF), wherein such cloud service or cloud software deployment platform can provide Internet as a Service (IaaS), Platform as a Service (PaaS), and Communications Platform as a Service (CPaaS). Although shown as separate entities, in certain implementations, the systems 210, 214, 218, and 222 can be one and the same. Furthermore, the 210, 214, 218, and 222 can be part of the same cloud service or cloud software deployment platform (e.g., PCF).

System 200 can further include the information handling system 100 and the connection pool service system 118, which provide common and centralized service for the processes 208, 212, 216 and 220. In certain implementations, the information handling system 100 includes a cache 224. Although shown as part of the information handling system 100, in other implementations, the cache 224 can be a persistent cache that is external/separate from the information handling system 100. For example, an external/separate cache 224 can be a REmote Data Server (Redis) or an elastic data store. Redis being an in-memory data structure project implementing a distributed, in-memory key-value database, where the cache 224 that can be considered at the same time a store and a cache.

The cache 224 can include reference IDs for connections between the processes 208, 212, 216 and 220 and the database 206 (user system 202). When initialized, the connection pool service system 118 can create a required number of connections for the processes 208, 212, 216 and 220, and generate the reference IDs which can be saved to cache 224.

The cache 224 can be accessible in distributed instances by the connection pool service system 118. In certain implementations, the cache 224 can maintain a key value pair with a hash key and connection object (or resource object), and with various attributes. Connection objects in the cache 224 are associated a reference ID. The key value pair and hash key (and attributes) can allow management directed to connection objects in the database 206, and update data/objects in the database 206.

In certain implementations, such as when operating on a CPaaS, auto scaling can be enabled, and provides that as demand increases for more connections based on a threshold value as deployed on a cloud service platform, autoscaling as to the connection pool service system 118 at the service level can also be provided. In certain implementations, processes 208, 212, 216 and 220, and legacy (i.e., monolithic) processes may be written or based on a software language platform such as Java, where a wrapper classes are created around connection classes. It is appreciated that no code change may be required as to the processes 208, 212, 216 and 220 in supporting legacy processes. For example, a bundled library can be provided as to a CPaaS client to support legacy processes.

In certain implementations, the information handling system 100 and the connection pool service system 118 can include various parameters (i.e., p1, p2, p3 . . . pn) that describe different connection attributes, such as connection timeouts, connecting time, connection usage, etc. Other example examples of such parameters can include a total number of records/instances that are getting processed, number of connections per record/instance, turnaround time of each record/instance, average payload size for network latency, etc. The number of such explanatory parameters can vary and can be used as further described to predict and provide connections to the processes 208, 212, 216 and 220.

A prediction model can be developed using artificial intelligence algorithms In certain implementations, the information handling system 100 and the connection pool service system 118 can include an artificial intelligence or AI module 226. The AI module 226 can be configured to perform process monitoring, or track and observe connection of processes 208, 212, 216 and 220, and determine over time which processes need more or less connections. This type of predictive analysis can include adjustments that are made as to giving or taking more connections as to certain processes. The determination can be as to which processes are requesting more connections, and which are rarely used/connected to process that do not need more connections. Therefore, the number of connections can be optimized. In certain implementations, the AI module 226 determines outlier processes that are seldom used/connected. A minimum number of connections can be provided to prevent "starvation" or complete disconnection with such outlier processes. In certain implementations, the AI module 226 can implement linear regression methods when performing the determination as to the use of connections by the processes 208, 212, 216 and 220.

In certain implementations, the processes 208, 212, 216 and 220 are allocated a basic number of connections, such as to support legacy applications and prevent "starvation" or non-use of the micro services or processes 208, 212, 216 and 220. The AI module 226 and its algorithm can dynamically allocate connections as needed by processes 208, 212, 216 and 220. Linear regression can be implemented as an algorithm by the AI module 226 to allow the connection pool service system 118 to observe and take action as to patterns of each of the processes 208, 212, 216 and 220 as to demand for connections and parameters, such as how long a process holds a connection on average, and to predict any unusual behaviors. For example, if a process takes an unusual amount of time to connect, the connection can be deallocated.

The use of linear regression can address a limited number of data sets, processes, and connections. A linear regression or linear prediction function can provide an approximate number of eligible connections during a given time frame. This linear prediction function can be modeled around a multiple-linear regression approach. A multiple-linear regression approach can be used, since the number of explanatory parameters (see below) may be simple and vary proportionately. Based on historic collected data, such a linear prediction function can run through the data and give the most approximate number and scalar response for current combinations of defined independent parameters. If additional values of the explanatory variables are collected without an accompanying response value, the fitted model can be used to make a prediction of the response.

In certain implementations, the connection pool service system 118 through the AI module 226 monitors heartbeat (operation) of registered processes (i.e., processes 208, 212, 216 and 220) based on parameters such as a total number of records/instances that are getting processed, number of connections per record/instance, turnaround time of each record/instance, average payload size for network latency, etc. Based on the observation, a decision or number can be determined as to a total number of connections needed in connection pool.

In certain implementations, the system 200 can include various administrators as represented by administrator 228. Administrator 228 can be business units, such as product support units, marketing, product development, security administrators, etc. In general, administrator 228 can include units directly or indirectly involved in supporting user 202 and/or administrating processes 208, 212, 216 and 220. Administrator 228 interacts with other users/systems of system 200 using administrator system 230. In certain implementations, the administrator system 230 can be representative of a business/computing environment that includes various computing devices (e.g., servers), storage, software solutions, hardware (e.g., accessories), etc. In certain implementations, the database 206 includes datasets, data structures, software applications, etc. that are provided data and/or updated from external processes or applications. In certain implementations, the administrator system 230 is part of cloud service.

The various systems of system 200 can be connected to one another through the network 140. In certain embodiments, the network 140 may be a public network, such as the Internet, a physical private network, a wireless network, a virtual private network (VPN), or any combination thereof. Skilled practitioners of the art will recognize that many such embodiments are possible, and the foregoing is not intended to limit the spirit, scope or intent of the invention.

Figure 3:
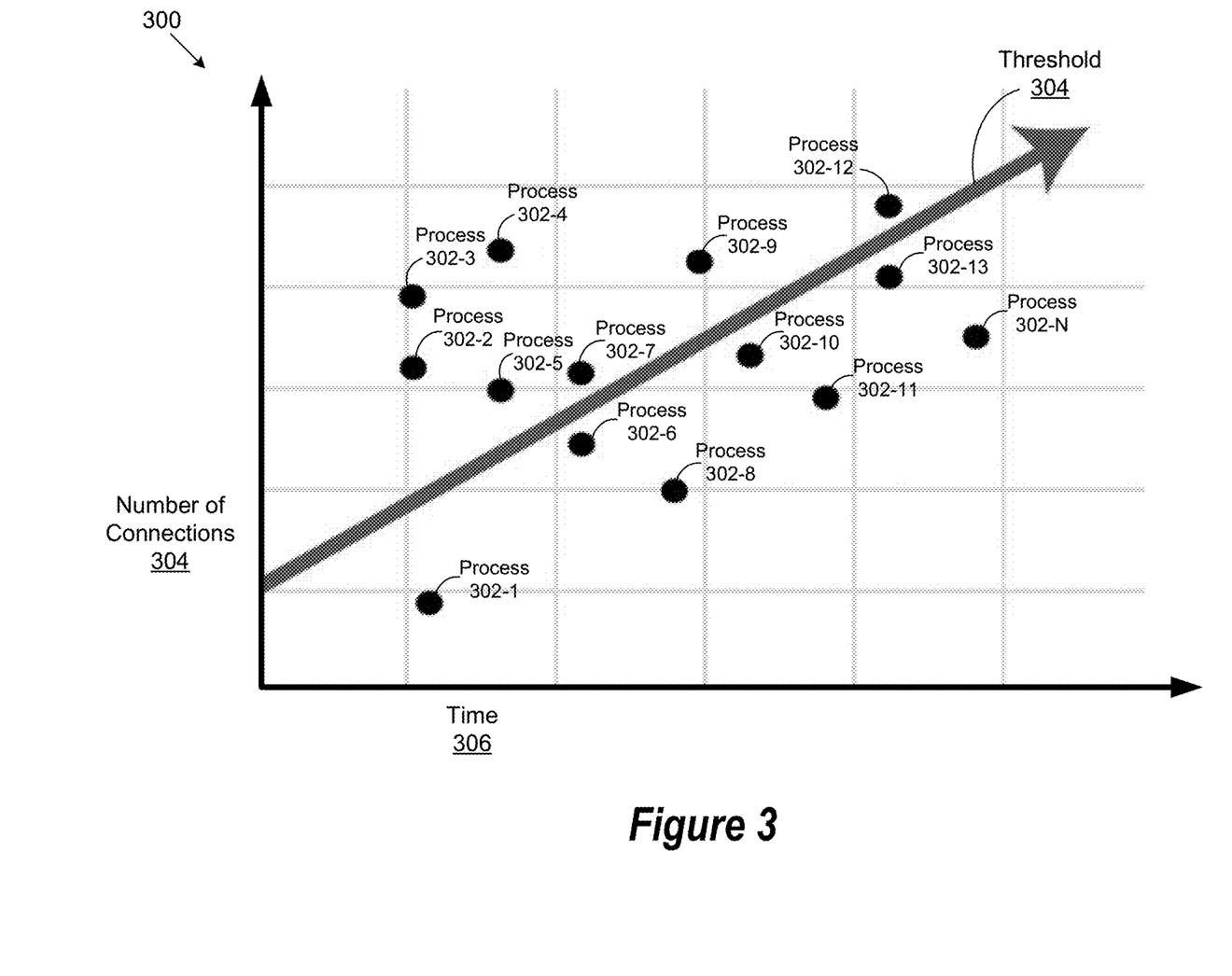
FIG. 3 is a simplified block diagram of a mapping of trends for connections of various processes.

FIG. 3 is a mapping of trends for connections of various processes. In certain implementations, the mapping 300 is resident at information handling system 100 and calculated/used by the connection pool service system 118 and AI module 226. The mapping 300 plots various processes 302-1, 302-2, 302-3, 302-4, 302-5, 302-6, 302-7, 302-8, 302-9, 302-11, 302-12, 302-13 to 302-N. The processes 302 are plotted as to a number of connections 304 over time 306. In certain instances, the processes 302 can include the same processes. In other words, at a certain time, the same process 302 is plotted, and at another time the same process is plotted again. A threshold 304 is provided in mapping 300.

In certain implementations, the mapping can keep track of current allocation of connection, timing, etc. Each process 302 can also be assigned with a weight or ranking, such as based on access data points for resources/connections and prioritized to allocate the resources/connections in proportion to rank or weight of processes 302. The AI module 226 and mapping can allow for predictive allocation of connections, in the event of resources/connections going short and prescribe to increase the threshold 304 to a maximum. In certain implementations, a notification can be made, and actions taken to deallocate certain unused resources/connections. The connection pool service system 118 and AI module 226 can provide for dynamic mapping, where updates are made based on feedback and usage of processes, trends, and events. Continued updating of the mapping of connections can be provided, where the connection pool service system 118 keeps mapping of connections for the applications, services and processes.

Figure 4:
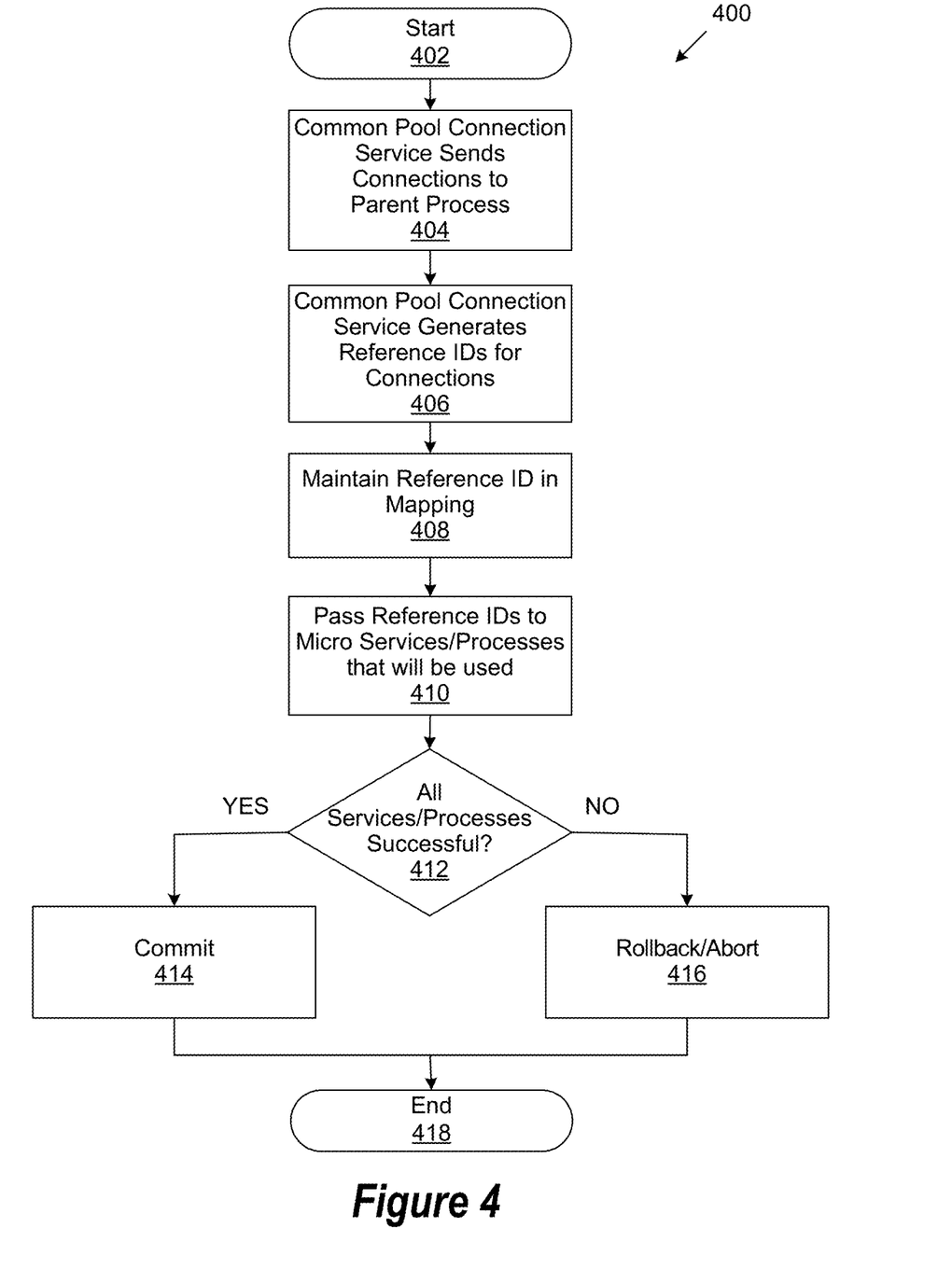
FIG. 4 is a general flowchart for managing a connection pool at a centralized service across multiple service clients or processes.

FIG. 4 is a generalized flowchart 400 for managing a connection pool at a centralized service across multiple service clients or processes. The order in which the method is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 402 the process 400 starts. At step 404, a centralized connection pool service system sends connections to a parent process. The parent process determines which micro services or processes are needed to provide data or perform and update as to a database/dataset of a user/customer. The parent process calls the particular micro services or processes. In certain implementations, the micro services can use a command pattern with client connection library behavior either to use local connection or common connection pool service with a flag enabled/disabled. To support legacy applications, code usage to connection or command pattern as to connection order can be implemented, avoiding any code changes to the legacy applications. In certain implementations, micro service contracts can implement a flag to execution transaction enabled or disabled mode. If a flag is enabled, then a reference ID is expected from the parent process to allow the use of the micro service or process.

At step 406, the connection pool service system generates reference IDs for the connections. The connection pool service system, instead of giving the connection to the parent process, provides connection to particular micro services or processes. Connection is made using reference ID. If the micro service wants to perform provide data or update, the connection pool is called by the micro service or process with the reference ID. With a reference ID, micro service or process selects from a cache, the actual connection outlet that is associated with the particular reference ID. Therefore, all updates/modifications take place through a single reference ID and single connection to the "database."

At 408, reference IDs are maintained in a mapping of the connection pool service system. In certain implementations, artificial intelligence can be applied to the mapping along tracking of the reference IDs with the connections. In particular, dynamic usage of connections by micro services or processes can be implemented.

At block 410, the reference IDs can be passed to the micro services or processes. In certain implementations, the reference IDs or connection IDs can also be passed on to a customer/user update service.

If all the required services or processes for an update or providing for data, are successful, then following the YES branch of block 412, at step 414 a commit is performed by the parent process for the database, such that a single point (process) for commit is performed. At block 418, the process 400 ends.

If all the required services or processes for an update or providing for data, are not successful, then following the NO branch of block 412, at step 416 a rollback to previous state or an abort is performed by the parent process for the database, such that a single point (process) for rollback/abort is performed. At block 418, the process 400 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object-oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Skilled practitioners of the art will recognize that many such embodiments are possible, and the foregoing is not intended to limit the spirit, scope or intent of the invention. Consequently, the invention is intended to be limited only by the spirit and scope of the appended claims, giving full cognizance to equivalents in all respects.

What is claimed is:

1. A computer-implementable method for management of a centralized service for transaction handling across multiple processes comprising:
    sending connections to a parent process that determines the multiple processes that are used to provide data or upgrade to a user database;
    generating reference identifiers for the connections;
    mapping the reference identifiers;
    connecting the multiple processes using the reference identifiers to the database to perform provide data or upgrade to the user database; and
    receiving an abort or rollback if all of the other processes are not successful in providing the data or upgrading the user database or receiving a commit if all of the multiple processes are successful in providing the data or upgrading the user database.

2. The method of claim 1, wherein the method is performed on a cloud service or cloud software deployment platform.

3. The method of claim 1, wherein the multiple processes are accessed through a REpresentational State Transfer (REST) Application Program Interface.

4. The method of claim 1, wherein the user database includes datasets, data structures and software applications.

5. The method of claim 1, wherein the mapping and the reference identifiers are stored in a cache.

6. The method of claim 1, wherein the mapping includes dynamic updates that predict usage of connections by the multiple processes.

7. The method of claim 6, wherein the dynamic updates uses linear regression as to parameters associated with the connections of the multiple processes.

8. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations for improved management of a centralized service for transaction handling across multiple processes executable by the processor and configured for:
        sending connections to a parent process that determines the multiple processes that are used to provide data or upgrade to a user database;
        generating reference identifiers for the connections;
        mapping the reference identifiers;
        connecting the multiple processes using the reference identifiers to the database to perform provide data or upgrade to the user database; and
        receiving an abort or rollback if all of the other processes are not successful in providing the data or upgrading the user database or receiving a commit if all of the multiple processes are successful in providing the data or upgrading the user database.

9. The system of claim 8, wherein the system part of a cloud service or cloud software deployment platform.

10. The system of claim 8, wherein the multiple processes are accessed through a REpresentational State Transfer (REST) Application Program Interface.

11. The system of claim 8, wherein the user database includes datasets, data structures and software applications.

12. The system of claim 8, wherein the mapping and the reference identifiers are stored in a cache.

13. The system of claim 8, wherein the mapping includes dynamic updates that predict usage of connections by the multiple processes.

14. The system of claim 13, wherein the dynamic updates uses linear regression as to parameters associated with the connections of the multiple processes.

15. A non-transitory, computer-readable storage medium embodying computer program code, the computer program code comprising computer executable instructions configured for:
    sending connections to a parent process that determines the multiple processes that are used to provide data or upgrade to a user database;
    generating reference identifiers for the connections;
    mapping the reference identifiers;
    connecting the multiple processes using the reference identifiers to the database to perform provide data or upgrade to the user database; and
    receiving an abort or rollback if all of the other processes are not successful in providing the data or upgrading the user database or receiving a commit if all of the multiple processes are successful in providing the data or upgrading the user database.

16. The non-transitory, computer-readable storage medium of claim 15, wherein the multiple processes are accessed through a REpresentational State Transfer (REST) Application Program Interface.

17. The non-transitory, computer-readable storage medium of claim 15, wherein the user database includes datasets, data structures and software applications.

18. The non-transitory, computer-readable storage medium of claim 15, wherein the mapping and the reference identifiers are stored in a cache.

19. The non-transitory, computer-readable storage medium of claim 15, wherein the mapping includes dynamic updates that predict usage of connections by the multiple processes.

20. The non-transitory, computer-readable storage medium of claim 19 wherein the dynamic updates uses linear regression as to parameters associated with the connections of the multiple processes.

* * * * *